May 3, 1927.  
H. E. STOCKSTAD  
SAFETY HOOK  
Filed March 15, 1926

1,626,642

Inventor  
Harold E. Stockstad,  
By  
S. G. Stevens.  
Attorney

Patented May 3, 1927.

1,626,642

UNITED STATES PATENT OFFICE.

HAROLD E. STOCKSTAD, OF DULUTH, MINNESOTA.

SAFETY HOOK.

Application filed March 15, 1926. Serial No. 94,682.

This invention relates to safety hooks and has for its principal object to provide such a hook which may be readily fastened or unfastened, and when fastened or hooked will be proof against accidental disconnection.

Another object is to provide such a safety hook of simple, durable and inexpensive construction, and one wherein the addition of the safety means does not weaken the hook to which applied.

Other objects of the invention will appear in the further description thereof.

Referring now to the accompanying drawing, forming part of this application and wherein like reference characters indicate like parts:

Figure 1:
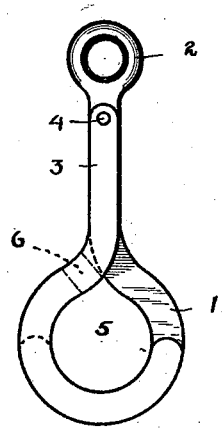
Figure 1 is a side elevation of my improved hook.
Figure 2:
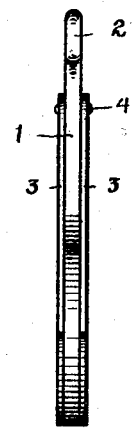
Figure 2 is a side elevation thereof.
Figure 3:
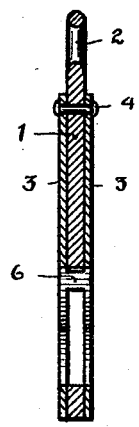
Figure 3 is a vertical central section of the hook.

The main hook is indicated at 1, it being the same as any ordinary hook, the upper end of which is in the form of an eye 2, which may engage a line or chain, or other means with which the hook may be used. Upon either side of the hook 1 is a relatively thin sister hook 3—3, the upper end of each of which is pivoted to the shank of the hook 1 as by the pin or rivet 4 which passes through the shank of the hook adjacent the eye 2. The hooks 3 are almost identical in shape to the hook 1, and are positioned in opposite relation so that when closed they inclose a space 5 through which the element supported passes. At 6 I have shown a rectangularly shaped filler piece which in thickness is just equal to that of the hook 1 and which is welded or otherwise formed integral with the sister hooks 3—3 thereby holding them approximately midway their ends spaced apart the required distance to properly function, or to allow the hook 1 to freely pass therebetween. It will be noted that the reinforcing or filler block 6 acts as a stop for the hook 1, or in other words the hooks cannot close upon each other closer than that shown in Figure 1 as the arcuate portion of the hook 1 at the base of the shank thereof engages the filler piece 6.

From the foregoing it is apparent that the hook 1 may function in all respects as an ordinary hook and that the addition of the safety sister hooks does not weaken the hook at all, but adds strength thereto, and when the hook is closed about a chain link or cable, and strain applied thereto the same cannot free itself from the hook.

Having thus described my invention, what I claim and desire to secure by Letters Patent, is:

In combination, a hook having an eye in one end thereof, a relatively thin sister hook pivotally mounted adjacent the eye upon either side of the hook, and integrally formed spacing means uniting the sister hooks for the purpose described.

In testimony whereof I hereunto affix my signature.

HAROLD E. STOCKSTAD.